United States Patent [19]
Yonezawa

[11] Patent Number: 5,388,856
[45] Date of Patent: Feb. 14, 1995

[54] AUTOMATIC TRANSMISSION CONTROL DEVICE

[75] Inventor: Shiro Yonezawa, Hyogo, Japan

[73] Assignee: Mitsubishi Denki Kabushiki Kaisha, Tokyo, Japan

[21] Appl. No.: 9,950

[22] Filed: Jan. 27, 1993

[30] Foreign Application Priority Data

Feb. 6, 1992 [JP] Japan .................. 4-020912

[51] Int. Cl.⁶ .............................................. B60G 11/26
[52] U.S. Cl. .................. 280/707; 364/424.05
[58] Field of Search ............... 280/707; 364/424.05, 364/424.1

[56] References Cited

U.S. PATENT DOCUMENTS

| | | | |
|---|---|---|---|
| 3,640,156 | 2/1972 | Mori et al. | 74/866 |
| 4,564,215 | 1/1986 | Kumagai et al. | 280/707 |
| 4,913,482 | 4/1990 | Hanai et al. | 296/65.1 |
| 5,162,997 | 11/1992 | Takahashi | 364/424.05 |

FOREIGN PATENT DOCUMENTS 0155653 9/1984 Japan .

*Primary Examiner*—Karin L. Tyson
*Assistant Examiner*—Paul N. Dickson
*Attorney, Agent, or Firm*—Sughrue, Mion, Zinn Macpeak & Seas

[57] ABSTRACT

An automatic transmission control device which is provided with shift pattern setting member for setting a shift pattern, on the basis of shift pattern mode for an automatic transmission which is selected by shift pattern mode selecting member and also on the basis of damping force of a suspension which is set by suspension setting member. Automatic transmission control member controls the shift operation of an automatic transmission on the basis of this set shift pattern.

12 Claims, 2 Drawing Sheets

AUTOMATIC TRANSMISSION CONTROL DEVICE

FIELD OF THE INVENTION

This invention relates to an automatic transmission control device which can change the shift point by means of selecting the damping force of a suspension, thereby improving the drivability.

FIG. 2 is a block diagram showing the system configuration of conventional automatic transmission control means, and FIG. 3 is a block diagram showing the system configuration of a conventional suspension control device. In FIG. 2, the automatic transmission control means is provided with shift pattern mode selecting means 1 for selecting a shift pattern mode, shift pattern setting means 3 for setting a shift pattern from the mode which is selected by the shift pattern mode selecting means 1, and automatic transmission control means 4 for controlling the shift operation on the basis of the shift pattern which is set by the shift pattern setting means 3.

In FIG. 3, the suspension control device is provided with suspension mode selecting means 2 for selecting a damping force of a suspension, and suspension control means 5 for controlling the switching of the damping force in accordance with the suspension mode which is selected by the suspension mode selecting means 2.

The operation of the means and device will now be described. A driver selects the shift pattern by operating the shift pattern mode selecting means 1. The shift pattern setting means 3 is provided with shift patterns as shown in FIG. 4 in which shift points are set on the basis of a vehicle speed and a throttle opening. Further, in an economy mode wherein the fuel consumption has priority, the shift point is positioned at a lower speed side, and, in a power mode wherein the driving force and acceleration are given with priority, the shift point is positioned at a higher speed side. In the shift pattern setting means 3, the shift pattern of the mode which is selected by the shift pattern mode selecting means 1 is set. The automatic transmission control means 4 shown in FIG. 2 controls the automatic transmission on the basis of information such as the vehicle speed, throttle opening and the shift pattern which are set by the shift pattern setting means 3. In the suspension control device of FIG. 3, the driver selects the damping force of the suspension by operating the suspension mode selecting means 2. Depending on the mode selected by the suspension mode selection means 2, the suspension control means 5 controls the suspension so as to switch the damping force.

In the conventional automatic transmission control means and suspension control device which are configured as described above, the shift pattern used in the automatic transmission control means 4 is exclusively selected by the shift pattern mode selecting means 1, and therefore the shift pattern remains unchanged even when the running conditions are changed and another mode for the suspension is selected. Accordingly, there is a problem in that the shift operation dose not match a desired running condition of the vehicle and hence the vehicle fails to perform in accordance with the desired running condition.

SUMMARY OF THE INVENTION

The invention has been made to obviate the aforementioned, providing an automatic transmission control device which allows a vehicle to operate in accordance with the driver's requirement so as to improve driveability.

The automatic transmission control device in the present invention comprises shift pattern setting means for setting a shift pattern on the basis of information from shift pattern mode selecting means and suspension selecting means.

Further, the shift pattern setting means has a variety of shift patterns corresponding to combinations of shift pattern modes and damping force values from the suspension selecting means, respectively, the shift pattern setting means comparing the combinations with a pair of the selected shift pattern mode and the set damping force value to set one of the variety of shift patterns for the shift operation.

According to the invention, the shift pattern set means sets a shift pattern, on the basis of the selected shift pattern mode for the automatic transmission, which is selected by the shift pattern mode selecting means and the damping force of the suspension, which in turn is selected by the suspension mode selecting means.

DETAIL DESCRIPTION OF PREFERRED EMBODIMENT

Figure 1:
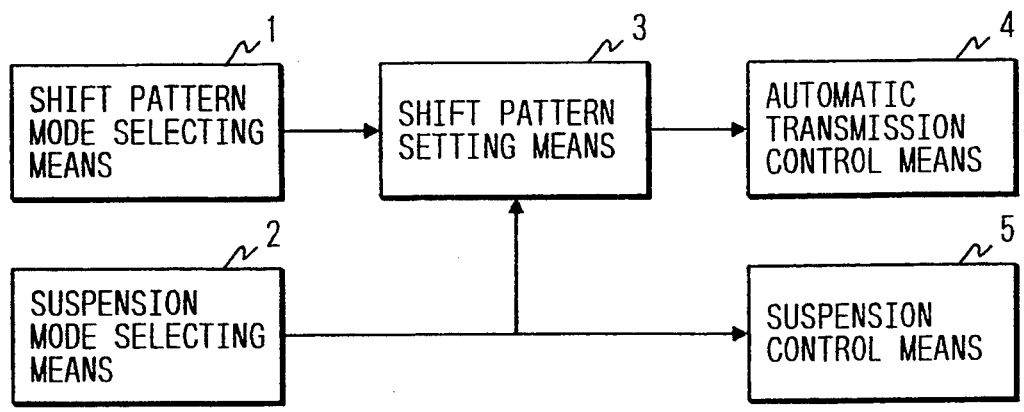
FIG. 1 is a block diagram showing the configuration of an automatic transmission control device which is an embodiment of the invention.
Figure 2:
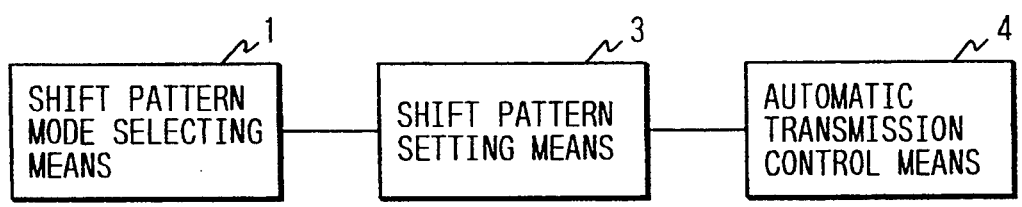
FIG. 2 is a block diagram showing the system configuration of conventional automatic transmission control means.
Figure 3:
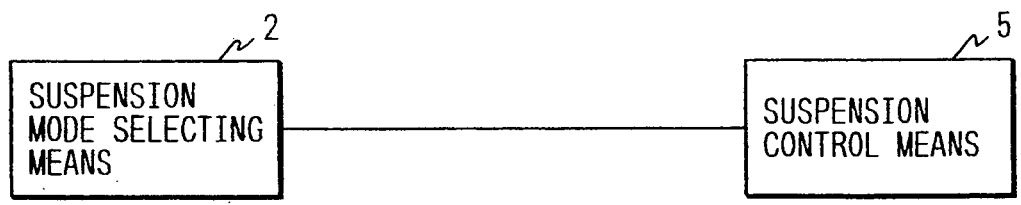
FIG. 3 is a block diagram showing the system configuration of a conventional suspension control device.
Figure 4:
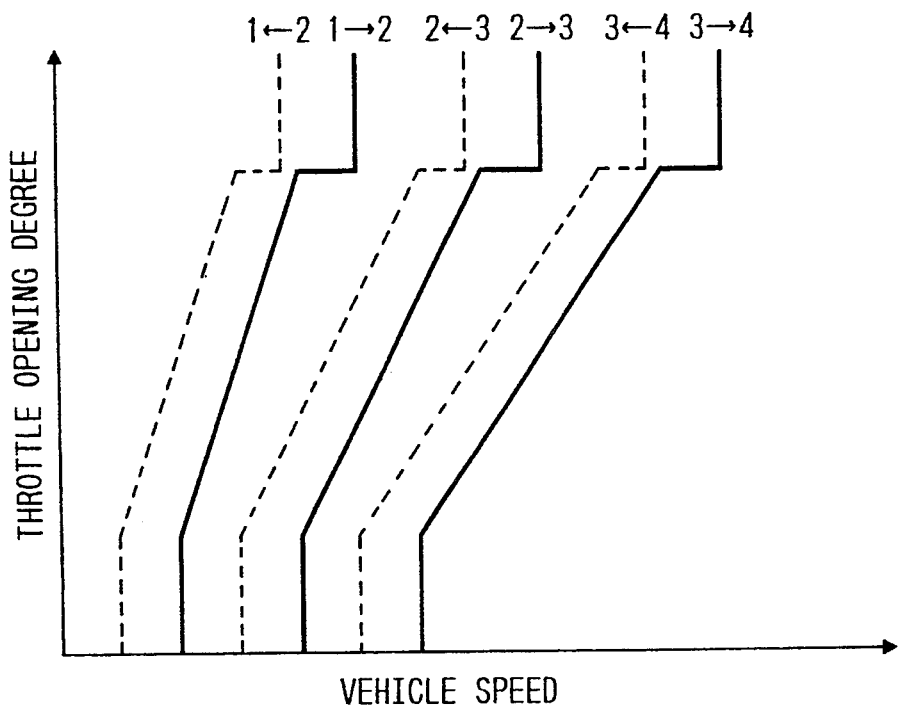
FIG. 4 is a view showing shift patterns used in a conventional automatic transmission control.

Hereinafter, an embodiment of the automatic transmission control device of the invention will be described with reference to the accompanying drawings. FIG. 1 is a block diagram showing the configuration of an embodiment of the invention. In FIG. 1, the components identical with those in FIGS. 2 and 3 are designated by the same references.

In FIG. 1, the control device is provided with shift pattern mode selecting means 1 for selecting a shift pattern mode of an automatic transmission, suspension mode selecting means 2 (as a suspension setting means) for selecting a damping force of a suspension, and shift pattern setting means 3 for setting a shift pattern, on the basis of the selected shift pattern mode which is selected by the shift pattern mode selecting means 1 and also the damping force of the suspension which is selected by the suspension mode selecting means 2. Thus, shift pattern setting means 3 is a feature of the invention.

Further, automatic transmission control means 4 controls the shift operation of the automatic transmission on the basis of the shift pattern which is set by the shift pattern setting means 3. And suspension control means 5 controls the damping force of the suspension in accordance with the selected damping force which is selected by the suspension mode selecting means 2.

The operation of the embodiment is now described. The shift pattern setting means 3 receives data of the shift pattern mode of the automatic transmission which is selected by the shift pattern mode selecting means 1 and also data of the damping force of the suspension which is selected by the suspension mode selection means 2. Thereupon, as shown in Table 1 below, the shift pattern setting means 3 sets the shift pattern, on the basis of a combination of the shift pattern mode which is selected by the shift pattern mode selecting means 1 and the damping force which is selected by the suspension mode selecting means 2, i.e. the selected suspension mode. The shift pattern thus set is input to the automatic transmission control means 4.

TABLE 1

|  |  | Shift Pattern Mode Selection | |
|---|---|---|---|
|  |  | Economy | Power |
| Suspension | Soft | a | c |
| Selection | Hard | b | d |

An example of the shift patterns listed in Table 1 above is now described. The shift pattern a has a shift point positioned in the side of a lower vehicle speed and gives priority to the fuel consumption. The shift pattern b has a shift point positioned in the side of a higher vehicle speed and gives priority to the driving force and acceleration as compared with the shift pattern a. The shift pattern c has a shift point positioned in the side of a vehicle speed higher than that of the shift pattern b. The shift pattern d has a shift point positioned in the side of a further higher vehicle speed and is most excellent among the four patterns in acceleration and driving force.

The automatic transmission control means 4 controls the automatic transmission, on the basis of sensor signals indicative of the actual vehicle speed, the actual throttle opening, etc. in accordance with the shift pattern which is set by the shift pattern setting means 3.

The suspension control means 5 controls the damping force of the suspension in accordance with the damping force value which is selected by the suspension mode selecting means 2.

As described above, according to the invention, the automatic transmission control device is so constructed that the shift pattern setting means sets the shift pattern, on the basis of the shift pattern information for the automatic transmission which is selected by the shift pattern mode selecting means and also on the basis of the damping force information for the suspension which is selected by the suspension mode selecting means, and that the automatic transmission control means controls the shift operation of the automatic transmission on the basis of the shift pattern this set. Therefore, the automatic transmission control device of the invention can achieve the effect that the running characteristics according to the driver's requirement are obtained and the driverbility is improved.

What is claimed is:

1. An automatic transmission control device for controlling a shift operation of a vehicle having a suspension, the device comprising:
    shift pattern mode selecting means for selecting a shift pattern mode of said shift operation;
    suspension setting means for setting a damping force value of said suspension;
    shift pattern setting means for setting an actual shift pattern for said shift operation on the basis of said selected shift pattern mode and said set damping force value; and
    transmission control means for controlling said shift operation on the basis of said actual shift pattern which is set by said shift pattern setting means.

2. A device according to claim 1, wherein said shift pattern setting means has a variety of shift patterns corresponding to combinations of shift pattern modes and damping force values, respectively, the shift pattern setting means comparing said combinations with a pair of said selected shift pattern mode and said set damping force value to set one of said variety of shift patterns for said shift operation.

3. A device according to claim 2, wherein said shift pattern modes include an economy mode in which a shift point for the shift operation thereof is in a lower vehicle speed side and a power mode in which the shift point for the shift operation thereof is in a higher vehicle speed side than said economy mode, and said suspension setting means includes a hard mode where a suspension control gain for the damping force is high and a soft mode where the suspension control gain for the damping force is low.

4. A device according to claim 1, further comprising suspension control means for controlling a damping force of the suspension according to said set damping force value.

5. An automatic transmission control device for controlling a shift operation of a vehicle having a suspension, the device comprising:
    driver-controlled shift pattern mode selecting means for selecting a shift pattern mode of said shift operation;
    suspension setting means for setting a damping force value of said suspension;
    shift pattern setting means for setting an actual shift pattern for said shift operation on the basis of said selected shift pattern mode and said set damping force value; and
    transmission control means for controlling said shift operation on the basis of said actual shift pattern which is set by said shift pattern setting means.

6. A device according to claim 5, further comprising suspension control means for controlling a damping force of the suspension according to said set damping force value.

7. In an automatic transmission system, a method for controlling a shift operation of a vehicle having a suspension comprising the steps of:
    selecting a shift pattern mode of said shift operation;
    setting a damping force value of said suspension;
    setting an actual shift pattern for said shift operation on the basis of said selected shift pattern mode and said damping force value; and
    controlling said shift operation on the basis of said actual shift pattern.

8. The method according to claim 7, wherein said step of setting an actual shift pattern comprises:
    comparing a variety of predetermined combinations of shift pattern modes and damping force values with the selected shift pattern mode selected in said selecting step and with the damping force value set in said step of setting a damping force value, to provide a comparison result; and
    setting the actual shift pattern based on the comparison result.

9. The method according to claim 7, wherein:
    said selecting step comprises selecting between an economy mode, in which a shift point for the shift operation thereof is in a lower vehicle speed side, and a power mode, in which the shift point for the shift operation thereof is in a higher vehicle speed side than said economy mode.

10. The method according to claim 7, wherein:
said step of setting a damping force value comprises selecting between a hard mode suspension setting, in which a suspension control gain for the damping force is high, and a soft suspension setting mode, in which the suspension control gain for the damping force is low.

11. The method according to claim 7, further comprising the step of controlling a damping force of the suspension of the vehicle according to the damping force value set in said step of setting a damping force value.

12. A device according to claim 5, wherein said suspension setting means is driver controlled.

* * * * *